(12) United States Patent
Ueda (10) Patent No.: US 8,072,855 B2
(45) Date of Patent: Dec. 6, 2011

(54) OPTICAL RECORDING/REPRODUCING APPARATUS AND OPTICAL RECORDING/REPRODUCING METHOD

(75) Inventor: Daisuke Ueda, Kanagawa (JP)

(73) Assignee: Sony Corporation, Tokyo (JP)

( * ) Notice: Subject to any disclaimer, the term of this patent is extended or adjusted under 35 U.S.C. 154(b) by 297 days.

(21) Appl. No.: 12/362,827

(22) Filed: Jan. 30, 2009

(65) Prior Publication Data

US 2009/0245043 A1 Oct. 1, 2009

(30) Foreign Application Priority Data

Mar. 26, 2008 (JP) .................................. 2008-081249

(51) Int. Cl.
*G11B 20/10* (2006.01)
(52) U.S. Cl. ......... 369/47.5; 369/116; 369/121; 372/18; 372/25
(58) Field of Classification Search .................. 369/47.5, 369/47.51, 47.52, 100, 116, 121
See application file for complete search history.

(56) References Cited

U.S. PATENT DOCUMENTS

| 5,546,415 A * | 8/1996 | Delfyett et al. ................. 372/25 |
| 2003/0165105 A1 * | 9/2003 | Leiber et al. ............. 369/110.01 |
| 2006/0182154 A1 * | 8/2006 | Tanaka et al. ..................... 372/9 |

FOREIGN PATENT DOCUMENTS

| JP | 4-325948 | 11/1992 |
| JP | 8-330680 | 12/1996 |

* cited by examiner

*Primary Examiner* — Daniell L Negron
*Assistant Examiner* — Brenda Bernardi
(74) *Attorney, Agent, or Firm* — Oblon, Spivak, McClelland, Maier & Neustadt, L.L.P.

(57) ABSTRACT

Disclosed is an optical recording/reproducing apparatus. The optical recording/reproducing apparatus includes a laser light source capable of emitting pulsed laser light in a mode-locked state in which light beams having different wavelengths are synchronized and the pulsed laser light is oscillated, means for controlling the laser light source to be changed from a state of emitting the laser light in the mode-locked state to a state of emitting continuous-wave laser light, and means for irradiating a recording medium with one of the laser light in the mode-locked state and the continuous-wave laser light.

7 Claims, 5 Drawing Sheets

OPTICAL RECORDING/REPRODUCING APPARATUS AND OPTICAL RECORDING/REPRODUCING METHOD

CROSS REFERENCES TO RELATED APPLICATIONS

The present invention contains subject matter related to Japanese Patent Application JP 2008-081249 filed in the Japanese Patent Office on Mar. 26, 2008, the entire contents of which being incorporated herein by reference.

BACKGROUND OF THE INVENTION

1. Field of the Invention

The present invention relates to an optical recording/reproducing apparatus and an optical recording/reproducing method using a mode-locked laser.

2. Description of the Related Art

In related art, there has been disclosed a technique in which data that has been subjected to high density recording is reproduced by irradiating a disc on which the data is recorded with pulsed reproduction light at the time of reading the data therefrom (see, Japanese Patent Application Laid-open No. HEI04-325948 (paragraph [0014])).

The above-mentioned technique relates to a data reproducing method. Meanwhile, a recording method using a pulse-emission type laser light source has been studied.

For example, there has been studied a new recording method (rose-type micro-reflector) of performing pseudo multi-layer recording by recording a blank cartridge on a recording medium by irradiating a recording medium with a short-pulse laser light having a high intensity at a constant frequency with the use of a pulse-emission type mode-locked laser in place of a continuous-emission type laser light source. Pulse laser light from the mode-locked laser can attain a significantly high optical density for optical recording, and thus is suitable for optical information recording.

SUMMARY OF THE INVENTION

However, when the pulse laser light from the mode-locked laser used at the time of recording is used again for reproducing information recorded on the recording medium, there arise the following problems: (1) because the mode-locked laser oscillates a pulse laser at a constant frequency, it is difficult to synchronize with a recording mark, (2) because the mode-locked laser emits pulse laser light having a high intensity, when a recording medium is irradiated with the pulse laser light, a recording mark recorded on the recording medium may be damaged, and (3) when another continuous-wave laser (light source) is introduced for reproduction only, an optical system becomes complicated, making a product design difficult.

In view of the above-described circumstances, it is desirable to provide an optical recording/reproducing apparatus and an optical recording/reproducing method capable of positively performing recording and reproduction with a simple structure using the mode-locked laser without damaging the recording mark.

According to an embodiment of the present invention, there is provided an optical recording/reproducing apparatus. The optical recording/reproducing apparatus includes a laser light source capable of emitting pulsed laser light in a mode-locked state in which light beams having different wavelengths are synchronized and the pulsed laser light is oscillated, means for controlling the laser light source to be changed from a state of emitting the laser light in the mode-locked state to a state of emitting continuous-wave laser light, and means for irradiating a recording medium with one of the laser light in the mode-locked state and the continuous-wave laser light.

In this embodiment, the means for controlling the laser light source to be changed from the state of emitting laser light in the mode-locked state to the state of emitting the continuous-wave laser light is provided. Therefore, at the time of recording, the recording medium is irradiated with the laser light in the mode-locked state at the predetermined time intervals and at high optical density, to record information, and at the time of reproduction, the controlling means changes the light emission state, to cause the laser light source to irradiate the recording medium with the continuous-wave laser light, with the result that the information recorded on the recording medium can be positively reproduced without damaging the recording medium. Further, the information can be recorded/reproduced with the single laser light source by changing the light emission state by the controlling means. Thus, the structure of the optical recording/reproducing apparatus can be simplified as compared to the case of including both the mode-locked laser light source and the continuous-laser light source.

The laser light source includes a resonator to generate the laser light in the mode-locked state, and the controlling means adjusts a resonator length of the resonator. With this structure, by adjusting the resonator length of the resonator, not the laser light in the mode-locked state but the continuous-laser light can be easily and positively generated.

The controlling means includes means for controlling a current that flows through a semiconductor device to control the laser light source. With this structure, by controlling the current that flows through the semiconductor device, with the result that the mode-locked state can be released at the time of reproduction and the recording medium can be irradiated with not the laser light in the mode-locked state but the continuous-laser light at the time of reproduction.

According to another embodiment of the present invention, there is provided an optical recording/reproducing method. The optical recording/reproducing method includes irradiating, in a mode-locked state in which light beams having different wavelengths are synchronized and pulsed laser light is oscillated, a recording medium with the laser light emitted from a laser light source, controlling the laser light source to be changed from a state of emitting the laser light in the mode-locked state to a state of emitting continuous-wave laser light, and irradiating the recording medium with the continuous-wave laser light.

In this embodiment, at the time of recording, the recording medium is irradiated with the laser light in the mode-locked state at the predetermined time intervals and high optical density, to record information, and at the time of reproduction, the laser light source can be controlled to change the same from the state of emitting the laser light in the mode-locked state to the state of emitting the continuous-wave laser light, with the result that, at the time of reproduction, the recording medium is irradiated with the continuous-wave laser light from the laser light source without damaging the recording medium, making it possible to reproduce the information recorded on the recording medium. Further, the information can be recorded/reproduced with the single laser light source by changing the light emission state. Thus, the structure of the optical recording/reproducing method can be simplified as compared to the case of using both the mode-locked laser light source and the continuous-laser light source.

The step of controlling the laser light source is performed by adjusting a resonator length of a mode-locked laser light source that emits the laser light in the mode-locked state. With this structure, not the laser light in the mode-locked state but the continuous-wave laser light can be easily and positively generated.

The step of controlling the laser light source is performed by controlling a current that flows through a semiconductor device to emit the laser light. With this structure, releasing the mode-locked state and generating the continuous-wave laser light can be easily and positively performed.

As described above, according to the embodiments of the present invention, it is possible to positively recording/reproducing information with the mode-locked laser and the simple structure without damaging the recording mark.

These and other objects, features and advantages of the present invention will become more apparent in light of the following detailed description of best mode embodiments thereof, as illustrated in the accompanying drawings.

DESCRIPTION OF PREFERRED EMBODIMENTS

Hereinafter, embodiments of the present invention will be described with reference to the drawings.

Figure 1:
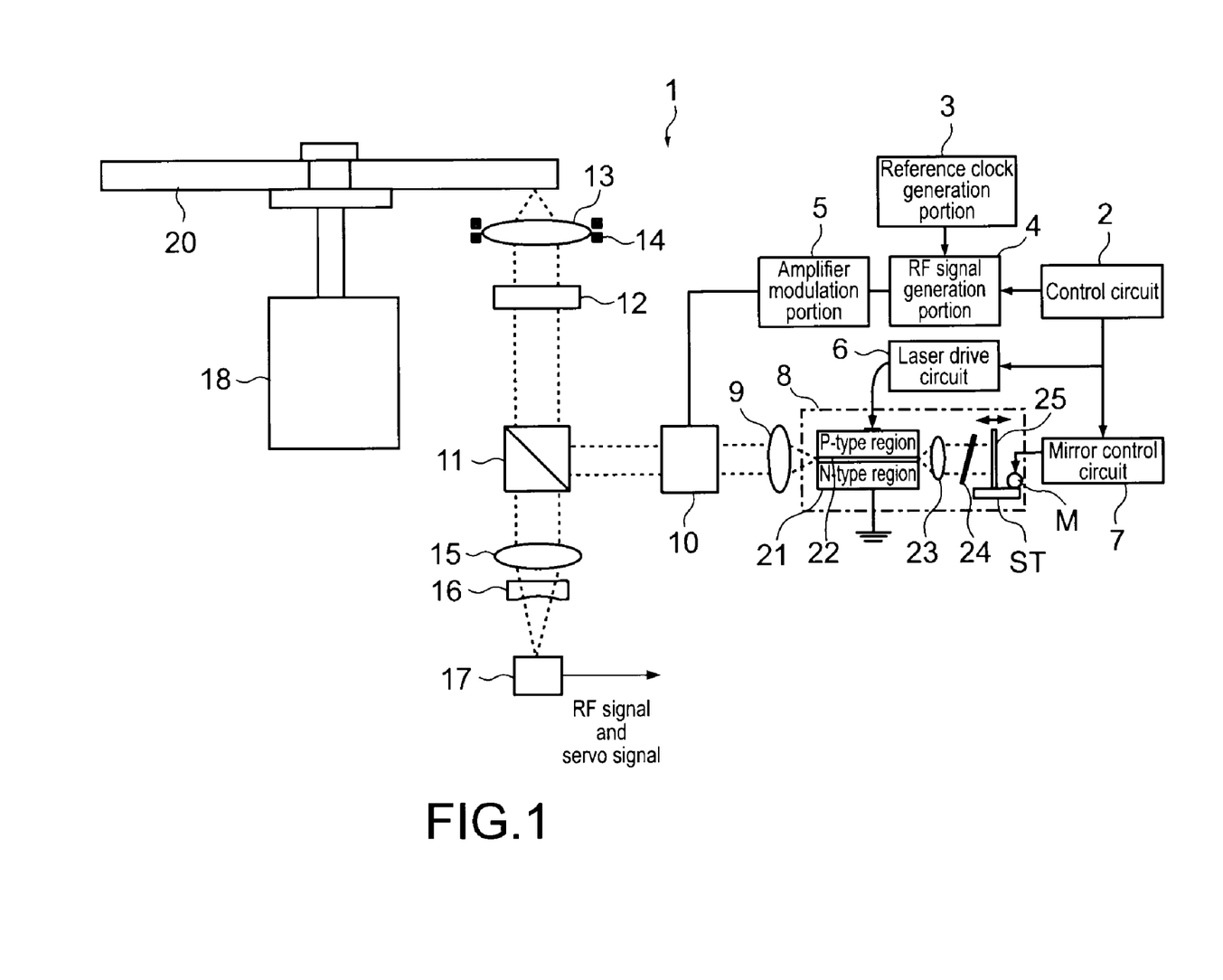
FIG. 1 is a block diagram showing an optical recording/reproducing apparatus according to a first embodiment of the present invention.
Figure 2:
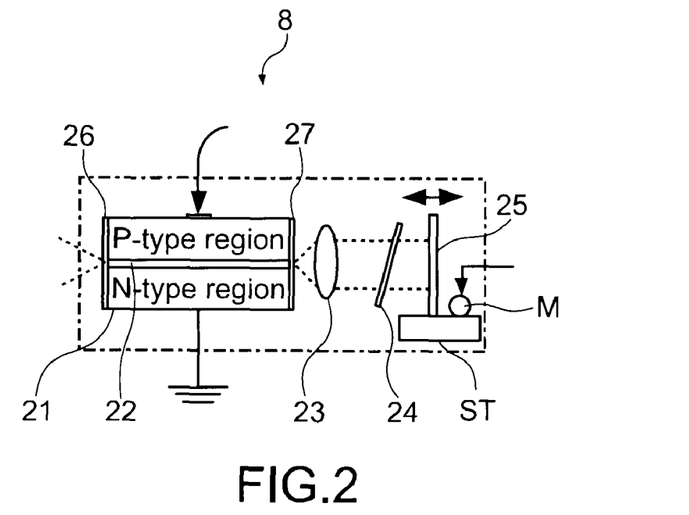
FIG. 2 is a diagram showing a structure of a mode-locked laser of the optical recording/reproducing apparatus.

FIG. 1 is a block diagram showing an optical recording/reproducing apparatus according to a first embodiment of the present invention. FIG. 2 is a diagram showing a structure of a mode-locked laser of the optical recording/reproducing apparatus.

As shown in FIG. 1, the optical recording/reproducing apparatus 1 includes a control circuit 2, a reference clock generation portion 3, an RF signal generation portion 4, an amplifier modulation portion 5, a laser drive circuit 6, a mirror control circuit 7, a mode-locked laser 8, a focusing lens 9, an optical amplifier 10, a beam splitter 11, a quarter-wave plate 12, an objective lens 13, an objective lens actuator 14, a focusing lens 15, a cylindrical lens 16, a photodetector 17, and a motor 18.

The control circuit 2 outputs to the RF signal generation portion 4 a control signal to cause the RF signal generation portion 4 to output an RF signal. Further, the control circuit 2 outputs to the laser drive circuit 6 a control signal to control the laser drive circuit 6. Further, the control circuit 2 outputs to the mirror control circuit 7 a position control signal to control the mirror control circuit 7.

The reference clock generation portion 3 is an oscillation circuit including a crystal oscillator, for example. The reference clock generation portion 3 generates a reference signal as a reference for causing the RF signal generation portion 4 to generate the RF signal, and outputs the reference signal thus generated to the RF signal generation portion 4.

The RF signal generation portion 4 is a phase-locked loop (PLL), for example. The RF signal generation portion 4 generates the RF signal based on the reference clock generated by the reference clock generation potion 3, and outputs the RF signal thus generated to the amplifier modulation potion 5.

The amplifier modulation potion 5 modulates (amplifies) the RF signal generated by the RF signal generation portion 4 and outputs the RF signal to the optical amplifier 10.

The laser drive circuit 6 supplies to a semiconductor laser 21 (described later) a current for driving the mode-locked laser 8 based on the control signal from the control circuit 2.

The mirror control circuit 7 outputs to a stage drive motor M (described later) a motor drive signal for controlling a position of the mirror 25 based on the position control signal from the control circuit 2.

As shown in FIGS. 1 and 2, the mode-locked laser 8 includes a semiconductor laser 21, a focusing lens 23, a wavelength filter 24, a mirror 25, a stage drive motor M, and a stage ST.

The semiconductor laser 21 includes a P-type region, an N-type region, and an active layer 22 provided between the two regions. As shown in FIG. 2, on an output side surface (on the right side surface of the semiconductor laser 21 in FIG. 2) of the semiconductor laser 21, a light reflection film 26 that allows laser light to slightly exit it is formed. On a side surface opposite to the output side surface (on the left side surface of the semiconductor laser 21 in FIG. 2), an antireflection coating 27 is formed. As a result, the light reflection film 26 (semiconductor laser 21) and the mirror 25 form a resonance structure.

The focusing lens 23 appropriately adjusts laser light emitted from a side of the active layer 22 of the semiconductor laser 21, on which the antireflection coating 27 is provided, and causes the laser light to travel toward the wavelength filter 24.

The wavelength filter 24 causes laser light having a specific wavelength out of the laser light from the focusing lens 23 to pass therethrough toward the mirror 25.

The mirror 25 reflects the laser light from the wavelength filter 24 toward the wavelength filter 24. The laser light reflected by the mirror 25 passes through the wavelength filter 24, is focused by the focusing lens 23, passes through the active layer 22, and is reflected by the light reflection film 26, to be resonated.

By adjusting the position of the mirror 25 to a predetermined position, mode-locked laser light (short-pulse laser light) having a pulse width of e.g., a picosecond order and a predetermined frequency (e.g., 500 MHz) is emitted from the light reflection film 26. Further, by dislocating the mirror 25 from the predetermined position, CW (Continuous Wave) laser light can be emitted from the light reflection film 26 of the semiconductor laser 21.

In the stage drive motor M, a rotation shaft thereof is rotated and driven based on the motor drive signal from the mirror control circuit 7. The rotation shaft of the stage drive motor M is engaged with a gear (not shown) provided on the stage ST side. With this structure, along with the rotation of the rotation shaft of the stage drive motor M, the stage ST is moved in directions indicated by the two-headed arrow of FIG. 2.

On the stage ST, the mirror 25 is fixed, for example. Along with the movement of the stage ST in the directions of the arrow, the mirror 25 moves in the same direction. In accordance with the position of the mirror 25, the optical length of the resonating laser light is changed, to thereby switch between a mode-locked state and a non-mode-locked state.

The mode-locked state refers to a state in which light beams having different wavelengths are synchronized between the light reflection film 26 and the mirror 25 and the mode-locked laser light in a pulse form having, e.g., a picosecond-order pulse width and a predetermined frequency (e.g., 500 MHz) can be emitted, for example. The non-mode-locked state refers to a state in which the mode-locked laser light cannot be emitted and the CW laser light can be emitted, for example.

The focusing lens 9 causes the laser light emitted from the semiconductor laser 21 to travel toward the optical amplifier 10.

The optical amplifier 10 amplifies the laser light that has been emitted from the semiconductor laser 21 and has passed through the focusing lens 9 based on the output signal from the amplifier modulation portion 5. The optical amplifier 10 causes the laser light thus amplified to travel toward the beam splitter 11.

The beam splitter 11 reflects the laser light amplified by the optical amplifier 10 toward the quarter-wave plate 12.

The quarter-wave plate 12 polarizes the incident laser light from the beam splitter 11, and causes the laser light thus polarized to enter the objective lens 13.

The objective lens 13 focuses the incident laser light from the quarter-wave plate 12 on a predetermined position on a recording medium 20.

The objective lens actuator 14 controls the position of the objective lens 13.

The laser light focused on the predetermined position on the recording medium 20 is reflected, passes through the objective lens 13, the quarter-wave plate 12, and the beam splitter 11, and enters the focusing lens 15.

The focusing lens 15 focuses the laser light that has passed through the beam splitter 11 on the cylindrical lens 16.

The cylindrical lens 16 causes the laser light focused by the focusing lens 15 to travel toward the photodetector 17.

The photodetector 17 receives the laser light focused by the cylindrical lens 16, converts the laser light into an electrical signal, and outputs the electrical signal thus converted (e.g., an RF signal or servo signal) to a signal processing portion (not shown).

The motor 18 rotates and drives a rotation shaft thereof at a predetermined rotational speed. With this structure, a recording medium 20 mounted on the rotation shaft of the motor 18 is rotated at the predetermined rotational speed.

Next, an optical recording/reproducing method using the optical recording/reproducing apparatus 1 will be described.

Figure 3:
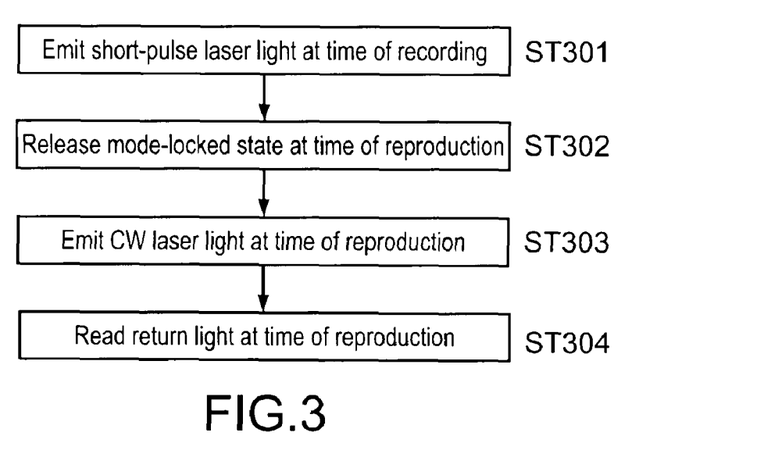
FIG. 3 is a flowchart for explaining a recording/reproducing operation of the optical recording/reproducing apparatus.

FIG. 3 is a flowchart for explaining a recording/reproducing operation of the optical recording/reproducing apparatus.

At the time of recording, the control circuit 2 adjusts the position of the mirror 25 so that the laser light emitted from the mode-locked laser 8 is brought into the mode-locked state.

That is, the control circuit 2 outputs the control signal to the mirror control circuit 7. The mirror control circuit 7 outputs the motor drive signal to the stage drive motor M based on the control signal from the control circuit 2. With this structure, the rotation shaft of the stage drive motor M is rotated, which moves the stage ST in the directions of the arrow. Along with this, the mirror 25 moves in the directions of the arrow. As a result, a length between the light reflection film 26 and the mirror 25 shown in FIG. 2, that is, a resonator length is adjusted so that the mode-locked laser light is emitted from the mode-locked laser 8 (mode-locked state).

In this state, the control circuit 2 outputs the control signal to the laser drive circuit 6. The laser drive circuit 6 supplies to the P-type region of the semiconductor laser 21 a current for driving the mode-locked laser 8 in the mode-locked state.

Thus, light is generated in the active layer 22, and as shown in FIG. 2, the light generated is diffused from the side surface on which the antireflective coating 27 is provided, passes through the focusing lens 23 and the wavelength filter 24, is reflected by the mirror 25, passes through the wavelength filter 24, is focused by the focusing lens 23, passes through the active layer 22 of the semiconductor layer 21, and is reflected by the light reflection film 26 of the semiconductor laser 21. As a result, in the resonator (e.g., between the light reflection film 26 (semiconductor laser 21) and the mirror 25), the mode-locked state is caused, and thus the mode-locked laser light is emitted from a part in the light reflection film 26 that causes the laser light to slightly exit it (ST301).

After that, the mode-locked laser light emitted from the mode-locked laser 8 is amplified by the optical amplifier 10 and reflected by the beam splitter 11, for example, and thus the predetermined position on the recording medium 20 is irradiated with the mode-locked laser light via the objective lens 13. As a result, a recording mark is formed on the recording medium 20, for example.

At the time of reproduction, the control circuit 2 releases the mode-locked laser 8 from the mode-locked state and brings the mode-locked laser 8 into the non-mode-locked state (ST302).

Specifically, the control circuit 2 outputs the control signal to the mirror control circuit 7. The mirror control circuit 7 outputs the motor drive signal to the stage drive motor M. In accordance with this, the rotation shaft of the stage drive motor M is rotated, which moves the stage ST in the directions of the arrow. Along with this, the mirror 25 moves in the directions thereof. As a result, the length between the light reflection film 26 and the mirror 25 shown in FIG. 2, that is, the resonator length is adjusted so that not the mode-locked laser light but the CW laser light is emitted from the mode-locked laser 8 (non-mode-locked state).

In the non-mode-locked state, the control circuit 2 outputs the control signal to the laser drive circuit 6. The laser drive circuit 6 supplies a current for driving the mode-locked laser 8 to the P-type region of the semiconductor laser 21.

As a result, in the resonator (e.g., between the light reflection film 26 and the mirror 25), the non-mode-locked state is caused, and thus the CW laser light is caused to exit a part in the light reflection film 26 that causes the laser light to slightly exit it (ST303).

After that, the CW laser light emitted from the mode-locked laser 8 is reflected by the beam splitter 11, for example, and thus the predetermined position on the recording medium 20 where the recording mark has been formed is irradiated with the CW laser light via the objective lens 13. As a result, information recorded on the recording medium 20 is reproduced, for example (ST304).

As described above, according to this embodiment, the optical recording/reproducing apparatus 1 includes the control circuit 2 for controlling the mode-locked laser 8 to be changed from the state of emitting the mode-locked laser light in the mode-locked state (ST301) to the state of emitting the CW laser light (ST303), the mirror control circuit 7, the stage drive motor M, and the stage ST. Accordingly, at the time of recording, the recording medium 20 is irradiated with the mode-locked laser light at predetermined time intervals and with high optical density in the mode-locked state to record information. Meanwhile, at the time of reproduction, the emission state of the laser light is changed with the control circuit 2, the mirror control circuit 7, the stage drive motor M, the stage ST, and the like, and then the mode-locked laser 8 emits the CW laser light and irradiates the recording medium 20 therewith, with the result that the information recorded on the recording medium 20 can be positively reproduced without damaging the recording medium 20. In addition, with the single mode-locked laser 8 only, the light emission state can be changed using the control circuit 2, the mirror control circuit 7, the stage drive motor M, the stage ST, and the like, to record/reproduce the information. Therefore, the structure can be simplified, so further cost reduction and size reduction can be achieved as compared to a case where both the mode-locked laser 8 and a CW laser light source are provided.

Next, an optical recording/reproducing apparatus according to a second embodiment of the present invention will be described. It should be noted that in the second embodiment and the subsequent ones, the same constituents as those of the first embodiment are denoted by the same reference numerals, and their descriptions are omitted and different points will be mainly described.

Figure 4:
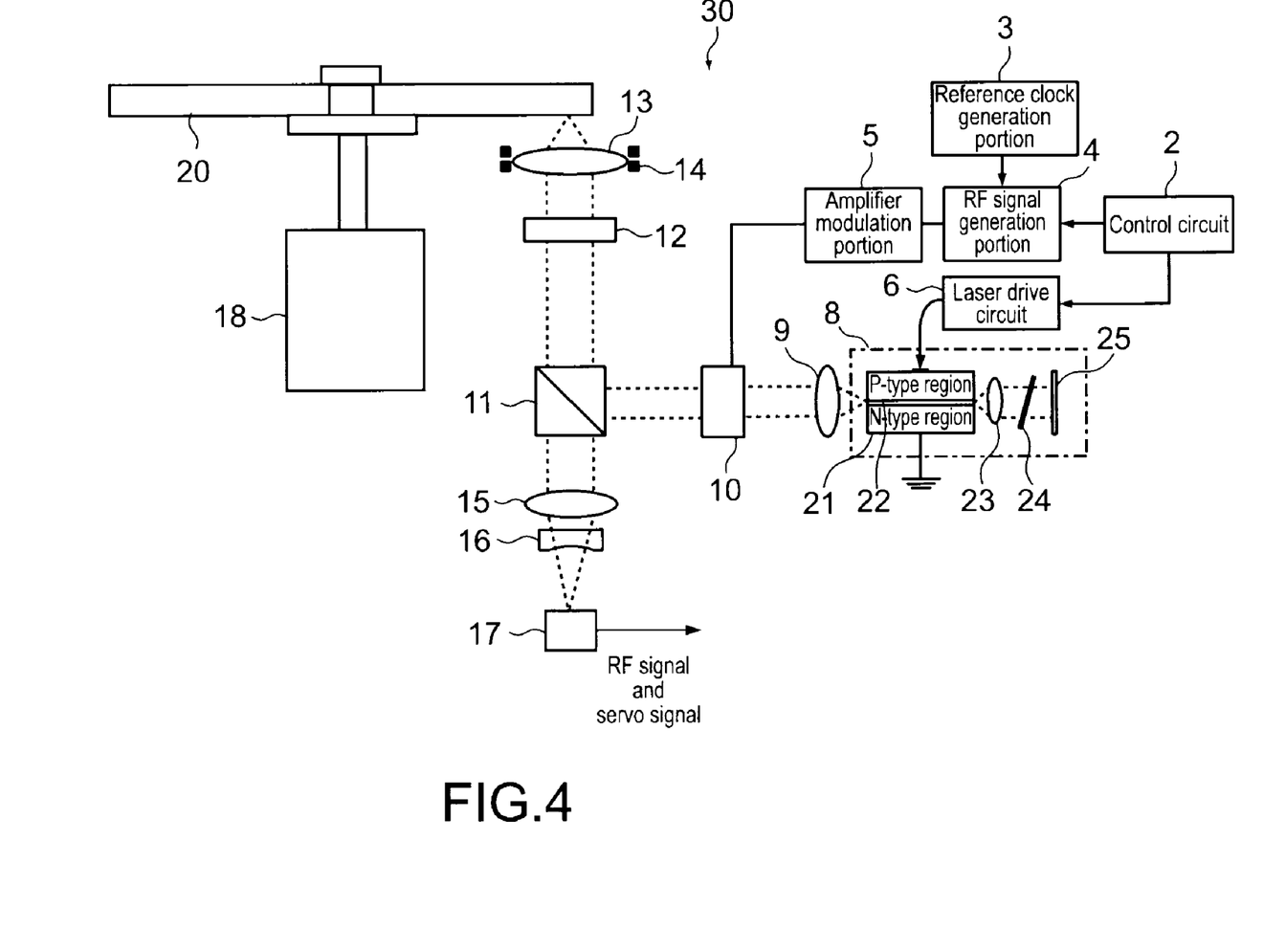
FIG. 4 is a block diagram showing a structure of an optical recording/reproducing apparatus according to a second embodiment.

FIG. 4 is a block diagram showing a structure of an optical recording/reproducing apparatus according to the second embodiment.

As shown in FIG. 4, an optical recording/reproducing apparatus 30 of the second embodiment is different from the optical recording/reproducing apparatus 1 of the first embodiment in that the optical recording/reproducing apparatus 30 includes the control circuit 2 for controlling the current that flows through the semiconductor laser 21 to control the light emission state of the mode-locked laser 8, but does not include the mirror control circuit 7, the stage drive motor M, and the stage ST. That is, there is no need to adjust the resonator length by moving the mirror 25.

The control circuit 2 outputs different control signals to the laser drive circuit 6. The laser drive circuit 6 outputs to the semiconductor laser 21 different currents (current values) based on the different control signals. As a result, when the current is the same as that in the first embodiment, the mode-locked laser 8 emits the mode-locked laser light, but when the current is different from that in the first embodiment, the mode-locked laser 8 is released from the mode-locked state, and therefore emits the CW laser light.

As described above, according to this embodiment, the optical recording/reproducing apparatus 30 includes the control circuit 2 that outputs the different control signals to the laser drive circuit 6 and the laser drive circuit 6 that outputs to the semiconductor laser 21 the different currents (current values) based on the different control signals, and controls the current that flows through the semiconductor laser 21. Therefore, at the time of reproduction, the mode-locked laser 8 is released from the mode-locked state and the recording medium 20 can be irradiated with not the mode-locked laser light but the CW laser light emitted from the mode-locked laser 8.

In this case, the mirror control circuit 7, the stage drive motor M, and the stage ST can be eliminated. Therefore, the structure of the optical recording/reproducing apparatus 30 can be further simplified, so further cost reduction and size reduction can be achieved.

Next, an optical recording/reproducing apparatus according to a third embodiment of the present invention will be described.

Figure 5:
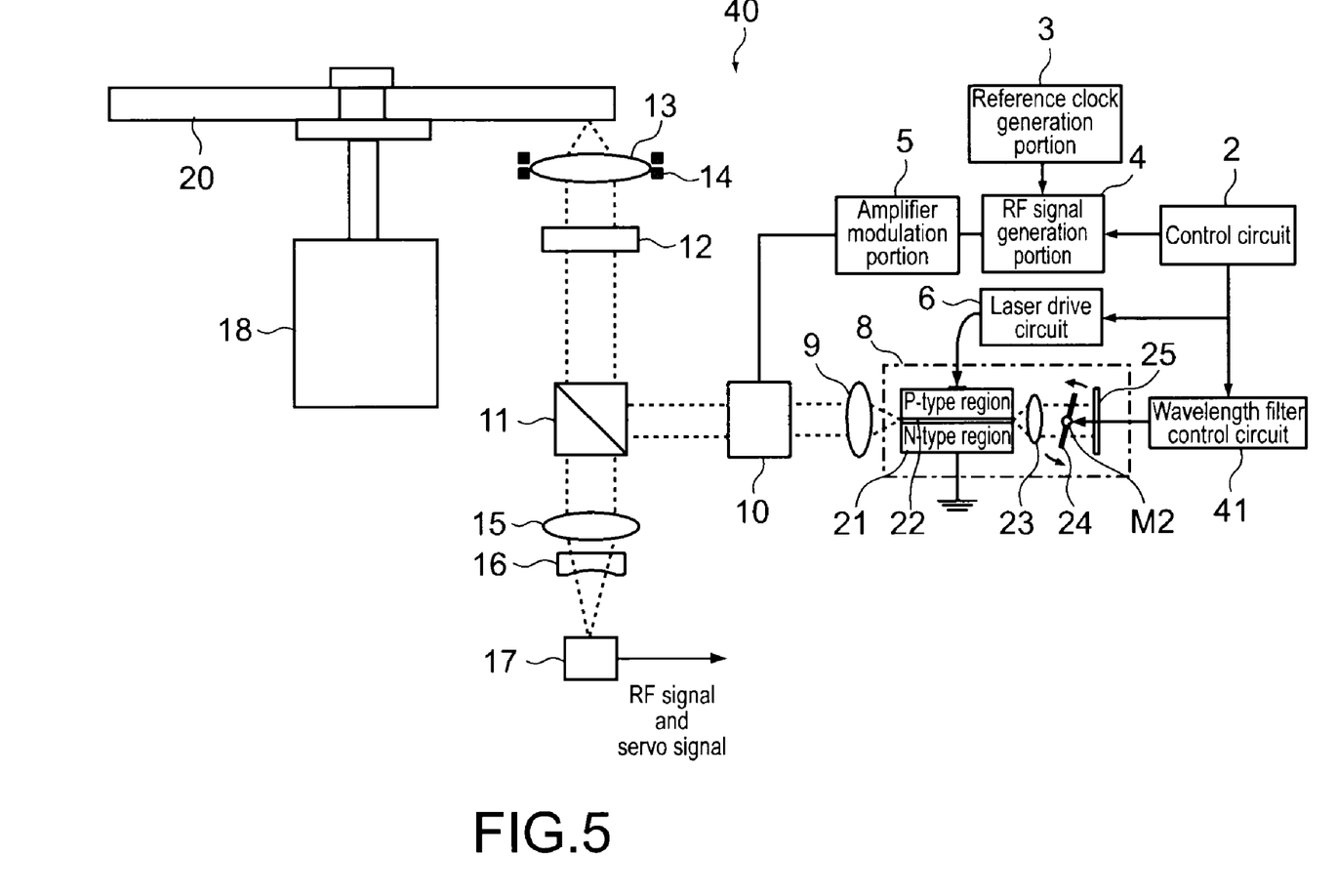
FIG. 5 is a block diagram showing a structure of an optical recording/reproducing apparatus according to a third embodiment of the present invention.

FIG. 5 is a block diagram showing a structure of an optical recording/reproducing apparatus according to the third embodiment of the present invention.

As shown in FIG. 5, an optical recording/reproducing apparatus 40 of the third embodiment 3 is different from the optical recording/reproducing apparatus 1 of the first embodiment in that the optical recording/reproducing apparatus 40 includes a wavelength filter control circuit 41 and a wavelength filter drive motor M2, instead of the mirror control circuit 7, the stage drive motor M, and the stage ST.

As shown in FIG. 5, the wavelength filter control circuit 41 outputs to the wavelength filter drive motor M2 a motor drive signal for controlling a position of the wavelength filter 24 based on the control signal from the control circuit 2.

Based on the motor drive signal from the wavelength filter control circuit 41, for example, the wavelength filter drive motor M2 rotates the wavelength filter 24 in a direction indicated by the rotation arrow of FIG. 5, to thereby adjust an optical length of laser light that passes through the wavelength filter 24. As a result, the light emission state of the mode-locked laser 8 is changed from the mode-locked state to the non-mode-locked state.

As described above, according to this embodiment, in the optical recording/reproducing apparatus 40, the wavelength filter control circuit 41 can rotate and drive the wavelength filter drive motor M2 based on the control signal from the control circuit 2, thereby rotating the wavelength filter 24 in the direction of the rotation arrow at the time of reproduction. As a result, the mode-locked state of the mode-locked laser 8 is changed to be the non-mode-locked state, and therefore the mode-locked laser 8 can emit the CW laser light. Consequently, the same effect as in the above embodiments can be obtained.

Next, an optical recording/reproducing apparatus according to a fourth embodiment will be described.

Figure 6:
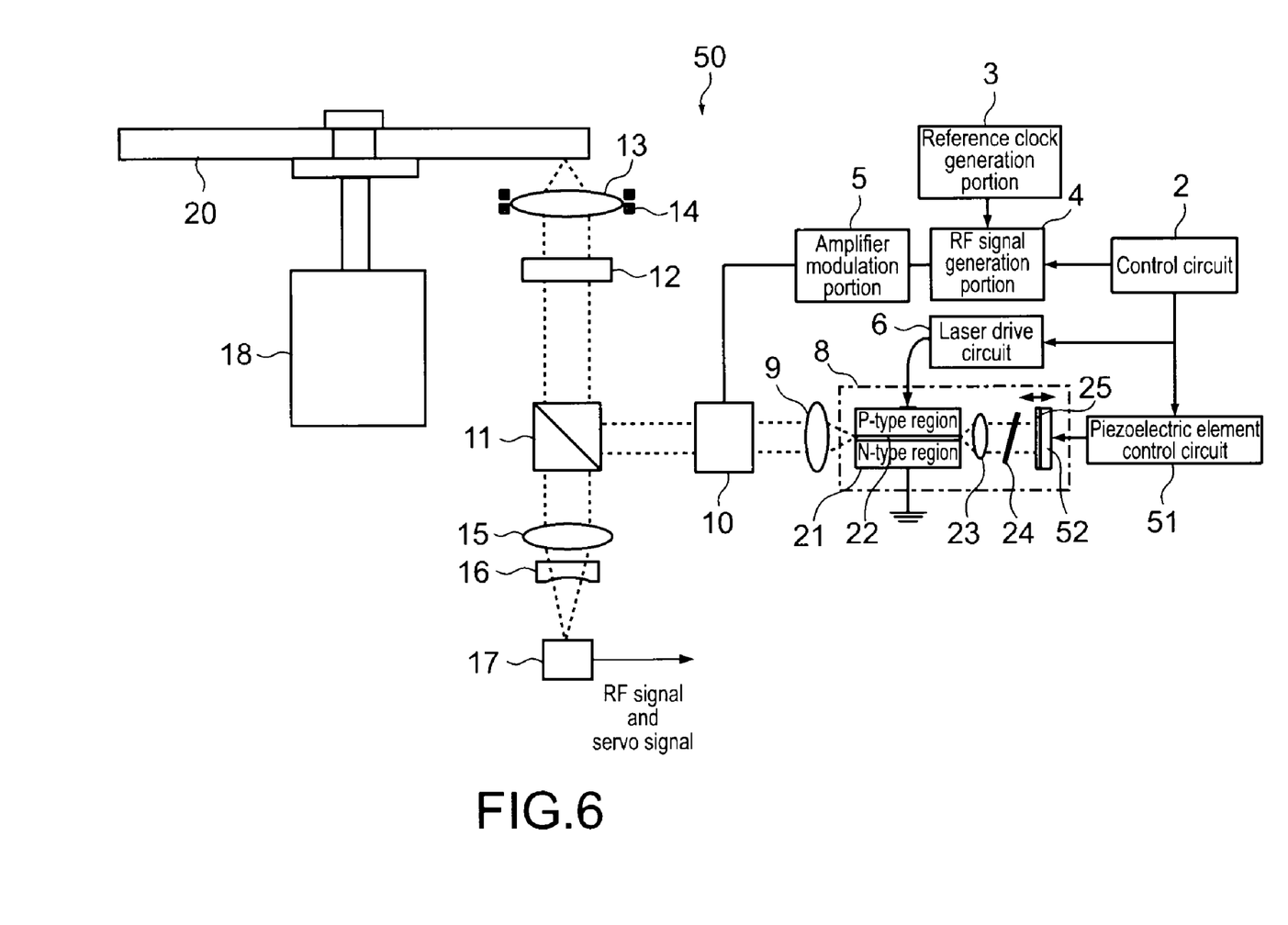
FIG. 6 is a block diagram showing a structure of an optical recording/reproducing apparatus according to a fourth embodiment.

FIG. 6 is a block diagram showing a structure of an optical recording/reproducing apparatus according to the fourth embodiment.

An optical recording/reproducing apparatus 50 of the fourth embodiment is different from the optical recording/reproducing apparatus 1 of the first embodiment in that the optical recording/reproducing apparatus 50 includes a piezoelectric element control circuit 51 and a piezoelectric element 52 shown in FIG. 6, instead of the stage drive motor M and the stage ST.

As shown in FIG. 6, the piezoelectric element control circuit 51 outputs to the piezoelectric element 52 a piezoelectric element control signal for controlling a voltage to be applied to the piezoelectric element 52.

Based on the piezoelectric element control signal from the piezoelectric element control circuit 51, for example, the piezoelectric element 52 changes in volume in directions of the double-headed arrow of FIG. 6. The piezoelectric element 52 is fixed to the mirror 25, for example. Accordingly, along with the volume change of the piezoelectric element 52, the position of the mirror 25 is adjusted in the directions of the arrow.

As described above, according to this embodiment, in the optical recording/reproducing apparatus 50, the piezoelectric element control circuit 51 outputs the piezoelectric element control signal to the piezoelectric element 52. Thus, at the time of reproduction, the piezoelectric element 52 is caused to change in volume, and along with this, the position of the mirror 25 integrally provided to the piezoelectric element 52 can be adjusted in the directions of the arrow. As a result, the same effect as in the first embodiment can be obtained.

It should be noted that the present invention is not limited to the above embodiments and can be variously modified within the scope of the technical idea of the present invention.

For example, in order to release the mode-locked laser 8 from the mode-locked state and allow the mode-locked laser 8 to emit the CW laser light, the position of the mirror 25 is controlled in the first embodiment, and the current that flows through the semiconductor laser 21 is controlled in the second embodiment. However, the present invention is not limited to those. Alternatively, for example, the current that flows through the semiconductor laser 21 may be controlled while controlling the position of the mirror 25. With this structure, at the time of reproduction, the mode-locked laser 8 can be more positively released from the mode-locked state, and the CW laser light can be emitted from the mode-locked laser 8.

What is claimed is:

1. An optical recording and reproducing apparatus, comprising:
    a laser light source that emits pulsed laser light in a mode-locked state in which light beams having different wavelengths are synchronized and the pulsed laser light is oscillated;
    means for controlling the laser light source to be changed from a state of emitting the laser light in the mode-locked state to a state of emitting continuous-wave laser light; and
    means for irradiating a recording medium with one of the laser light in the mode-locked state and the continuous-wave laser light,
    wherein the means for controlling the laser light includes means for controlling a current, that flows through a semiconductor device including the laser light source, to adjust a position of a single mirror in a resonator of the laser light source to be in one of the mode-locked state and the state of emitting continuous-wave laser light.

2. The optical recording and reproducing apparatus according to claim 1,
    wherein the resonator generates the laser light in the mode-locked state, and
    wherein the controlling means adjusts a resonator length of the resonator.

3. An optical recording and reproducing method, comprising:
    irradiating, in a mode-locked state in which light beams having different wavelengths are synchronized and pulsed laser light is oscillated, a recording medium with the laser light emitted from a laser light source;
    controlling the laser light source to be changed from a state of emitting the laser light in the mode-locked state to a state of emitting continuous-wave laser light; and
    irradiating the recording medium with the continuous-wave laser light,
    wherein the step of controlling the laser light includes controlling a current, that flows through a semiconductor device including the laser light source, to adjust a position of a single mirror in a resonator of the laser light source to be in one of the mode-locked state and the state of emitting continuous-wave laser light.

4. The optical recording and reproducing method according to claim 3,
    wherein adjusting the position of the single mirror adjusts a resonator length of the laser light source that emits the laser light in the mode-locked state.

5. An optical recording and reproducing apparatus, comprising:
    a laser light source that emits pulsed laser light in a mode-locked state in which light beams having different wavelengths are synchronized and the pulsed laser light is oscillated;
    a controller that controls a laser light source to be changed from a state of emitting the laser light in the mode-locked state to a state of emitting continuous-wave laser light; and
    a recording medium that is irradiated with one of the laser light in the mode-locked state and the continuous-wave laser light,
    wherein the controller controls a current, that flows through a semiconductor device including the laser light source, to adjust a position of a single mirror in a resonator of the laser light source to be in one of the mode-locked state and the state of emitting continuous-wave laser light.

6. An optical recording and reproducing apparatus according to claim 5, further comprising a mirror controller that outputs a motor drive signal for changing a position of the single mirror,
    wherein changing the position of the single mirror adjusts a resonator length of the resonator.

7. An optical recording and reproducing apparatus according to claim 6,
    wherein the recording medium is mounted on a rotational shaft of a motor driven by the mirror controller and rotates at a predetermined rotational speed.

\* \* \* \* \*